Dec. 2, 1941.  P. A. WARD  2,264,961
THERMAL INSULATION STRUCTURE
Filed June 21, 1937  2 Sheets-Sheet 1
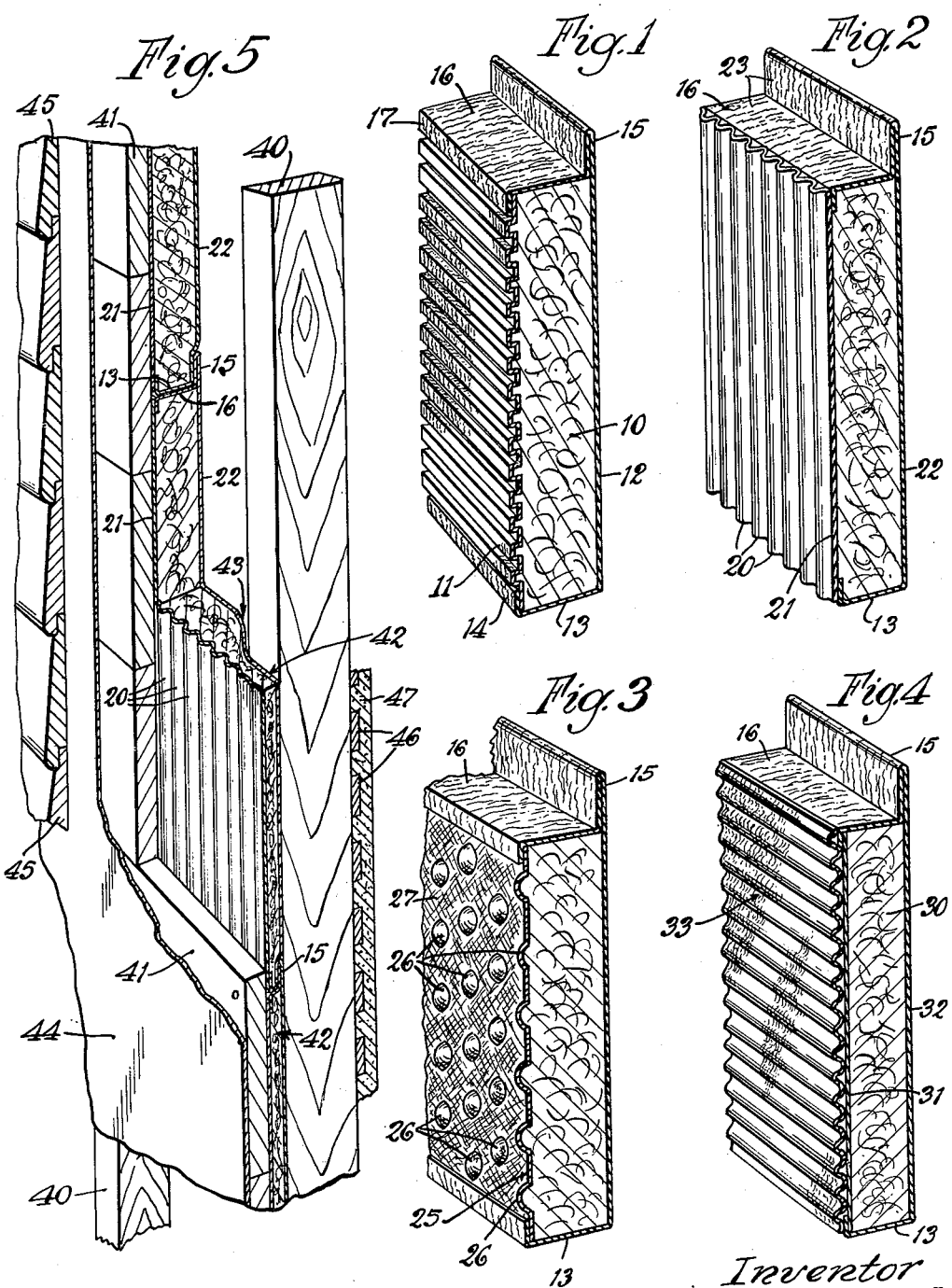
Inventor
Paul A. Ward
by W. Bartlett Jones,
Attorney.

Dec. 2, 1941.   P. A. WARD   2,264,961
THERMAL INSULATION STRUCTURE
Filed June 21, 1937   2 Sheets-Sheet 2
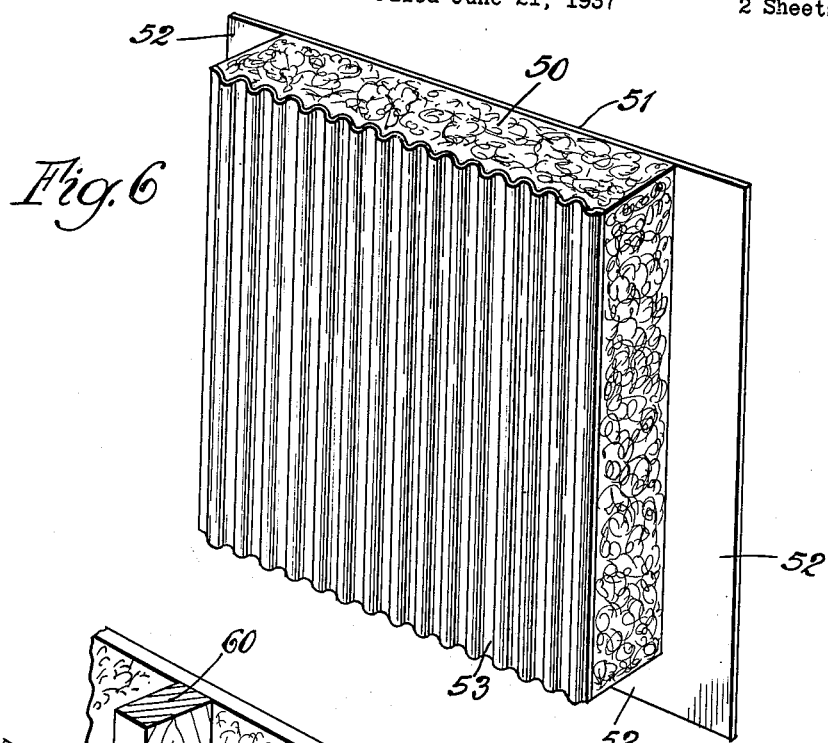
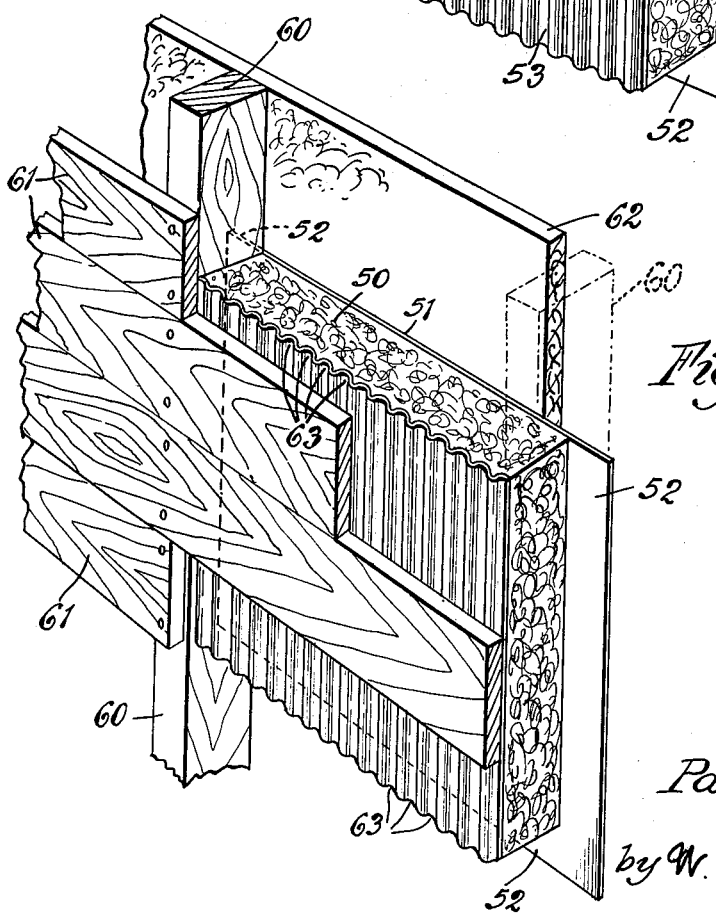
Inventor
Paul A. Ward
by W. Bartlett Jones
Attorney.

Patented Dec. 2, 1941

2,264,961

UNITED STATES PATENT OFFICE 2,264,961

THERMAL INSULATION STRUCTURE

Paul A. Ward, St. Paul, Minn., assignor to Wood Conversion Company, Cloquet, Minn., a corporation of Delaware Application June 21, 1937, Serial No. 149,373

3 Claims. (Cl. 20—4)

The present invention relates to thermal insulation and thermally insulated wall structures. It has particular reference to insulation between relatively warm and cold regions under those differential conditions where humid air forms dew or ice from dew.

Although there has always been a dew problem in insulation, it has not been seriously considered because normal prevailing conditions coupled with a large number of prevailing methods of installing insulation structures have resulted in more or less self-correction. However, recent trends in using insulation, and in air-conditioning, have increased the dew problems to a point where real problems are presented. In the Weyerhaeuser and Busch U. S. Patent No. 2,030,668, the problem is discussed. It is therein explained how the humidity from the warm side, as in air conditioned houses, can condense in insulation to wet the same, and even freeze to destroy its insulating value and to damage the material. Further experience has shown that some insulation structures tend to damage the structural parts of a wall as well as the insulation material.

The problem is briefly stated. Between a warm and a cold space there is an insulation wall. The warm air on one side may move through the wall toward the cold side, and thus as it is cooled, the capacity to hold moisture vapor is reduced. Moisture in excess of the holding capacity of the air is condensed to form dew. As water now, rather than vapor, it may move independently of the air, and it wets and spreads wherever permitted. It may reach a place so cold that it freezes to ice. Insulation value is lost by collection of dew or ice and the cold zone moves nearer the warm zone. Thus more ice and dew may collect, and insulation efficiency decreases. The weight of ice or water may destroy the insulation, especially where movable fibers are loosely assembled, such as vegetable fibers, hair, asbestos, rock wool, glass wool, and the like. Not only the insulation, but studding, sheathing and other parts of the structure or wall absorb the water, or are weakened by ice formation. Frequently, the water is so retained for a long time before it can be dried out with changing conditions. During this wet period, rotting occurs. Heavy accumulations of ice in roofs and walls have been known to melt and water actually run to other places doing damage to plaster and wood. It may drip to sills and cause rotting. It may make damp cold walls because of no provision for quickly drying out the moisture.

Where insulation completely fills the space in a wall, varying out-of-door temperatures and conditions in cold seasons cause the dew-line to move back and forth from day to day. Where there is no loss of moisture from the cold side the entire thickness of insulation may become saturated with water in the course of a few months.

Recent trends in insulation accentuate the problem. The blowing of insulation fill into the wall spaces of ordinary structures between sheathing and inside wall finish is one cause. The use of "wall thick" unit or blanket insulation to completely fill the wall space is another cause, and it has several phases. The placing of insulation outside of studding and the nailing of sheathing over it is a third one and it also has several phases. All of these produce a continuous combination barrier of structure and insulation between heat and cold on opposite sides of the dew line, i. e. that movable line where moisture begins to precipitate. To be more specific, an example is given as it may be found in ordinary house structures. The outside wall of the house has its sheathing in direct contact with the "insulation material." Because of the general practice of putting building paper, which is often waterproofed paper, over the outside of the sheathing, there is practically no space for circulation of air to effect drying out of water from either the sheathing or the insulation material. Rotting is the eventual result, even though it may be several years before it is observed.

The present invention aims to minimize this difficulty by providing for a circulation of air between insulation material and the structural material. In other words the entire wall structure is provided on the inside with a space for circulation of air to dry out moisture, while preserving the substantial continuity or contiguity of material comprising the continuous barrier of structure and insulation, for example, face-to-face insulation material and sheathing. It is not to be considered that the object broadly of the invention is to provide an air space between, for example, sheathing and insulation, for that has long been done, but it is to be observed that in departing from the prior art structures which did provide such space, the recent trends have entirely destroyed that space, evidently not knowing of its valuable function.

It is to be realized that insulation is so commonly recognized today that it is used by the lay public, contractors and even engineers and architects, with consideration only of the insulating function, and without consideration of other factors which are incidentally involved. This situation in some degree has led to adverse opinion on the wisdom of using insulation, so that it becomes a problem of the insulation manufacturer to produce and market an insulation or building material the normal use of which results in avoidance or minimizing of the detrimental results.

It is therefore an object of the present invention to create a complete or partial wall structure which is substantially continuous between a warm side and a cold side, which comprehends the dew line, which has an efficient layer of insulation material face-to-face with other material, one or both of which may accumulate water, and which has the interface provided with channels or other form of ventilating space for the circulation of air to dry out the water.

A particular object of the present invention is to produce an insulated wall structure using insulation which has a face with elevations and depressions, which insulation permits contact of the elevations of the face with material like sheathing, while the depressions provide space for circulation of air.

The invention may be carried out in numerous ways and with numerous materials. The insulation may entirely fill space inside an ordinary wall, or it may fill but part of it. The insulation body or material may be of any suitable form, structure or material which is efficient as insulation, but the invention gives rise to greater benefits where the insulation is fiber, and particularly where the fiber body is not protected by waterproof liners. Such insulation material may be rigid or flexible. There are in common use, blocks or sections called "bats" which are fairly rigid for mounting in recesses between studding with a fiber face pressed against sheathing on the outside of studdings. These are made of vegetable fibers or of mineral fibers, or of flakes of mineral or vegetable material, or of mixed substances. Sponge material in block form is used for insulation in the same way. According to the present invention such insulation bodies are provided with a special face to insure a space for circulation of air at the interface when the face of the insulation is resting against another face, such as sheathing. The latter face may be of metal or other material which is non-absorbent of water, in which case the circulation space protects only the insulation body. However, where both the materials adjacent the interface are absorbent of water, the interface may protect both of such materials.

Flexible blanket insulation is also used, and forms are known which are made of fibers of animal, vegetable, mineral, or mixed origin. This insulation is ordinarily readily compressible. Hence, it, as well as other insulation structures, may be used as an inner sheathing by securing it to the outer side of studding on ordinary frame buildings before applying outer siding or sheathing. The latter is commonly wood boards, but it may be artificial board as strips or panels, or insulation board. When outer siding is so applied that it causes facial contact between it and the insulation, the present invention may be practiced to create an interface which ventilates.

In the accompanying drawings there are shown several exemplary structures embodying the present invention, and it is to be understood that these are not to be considered as limiting the invention to them.

Fig. 1 represents a perspective view and cross-section of insulation material provided with a corrugated face.

Fig. 2 is a modification in which the corrugations are of different form and in a different direction.

Fig. 3 is a further modified form in which the liner is provided with contact areas and depressed portions other than in corrugated form.

Fig. 4 is a modified form in which a corrugated sheet is added to an ordinary insulation with a flat-faced liner.

Fig. 5 represents an exemplary installation of one of the insulation materials of Figs. 1 to 4 inclusive.

Fig. 6 represents an insulation bat provided with a face for use in the present invention.

Fig. 7 represents a thermally insulated wall embodying the bat of Fig. 6.

Where the insulation is used as an inner sheathing between the studding and an outer sheathing the interfacial pressure between the two sheathings is considerable. Various forms of structures may be used to create a broken interface. It is preferred to apply a prepared face on the insulation. The face of the insulation may be coarsely corrugated in any direction as shown in Figs. 1 and 2. It may consist of raised areas pressed out from a sheet liner as in Fig. 3. It may be made by uniting a corrugated sheet to an ordinary face of insulation liner as in Fig. 4. The insulation may be entirely sealed to exclude moisture in which case the protection is exercised on the sheathing. The raised face of the insulation may be pervious to moisture to permit drying the water from the insulation as well as from the sheathing.

In Fig. 1 there is shown a strip of sealed insulation which may be wrapped in a horizontal direction around the studding of a building in the course of construction. The strip may be flexible or rigid, compressible or non-compressible. It is preferred to be flexible and compressible and to comprise loosely felted fibers 10. It carries on one face a corrugated sheet 11 with corrugations running with the length of the strip. Liner 11 may be of kraft paper pervious to water, or a waterproofed sheet which may be plain or creped. Liner 11 is preferably waterproofed where the insulation is entirely sealed. Liner 11 is preferably creped as well as corrugated where the insulation strip is flexible. A second liner completes enclosure of the insulation material shown and this preferably is waterproofed or creped to correspond with the liner 11. The second liner provides a face 12, a side seal 13, an edge 14 united to the liner 11, a folded flange 15 continuous with the face 10, a side seal 16, and a binding edge 17 united to the liner 11. The flange provides a means for readily securing the strip to studding.

A second strip is mounted with its face 13 in contact with face 16, whereby the flange 15 also provides a seal over the joint. The fiber mat 10 may be made in various ways, for example according to Weiss U. S. Patents No. 1,336,402, No. 1,336,403, and No. 1,336,404. The fiber may be vegetable or mineral, and when the strip is desirably compressible the fiber is very loosely felted.

Fig. 2 is a modified form of the strip shown in Fig. 1. The essential change is in the direction of the corrugations 20 in the liner 21. These may be square formed as shown in Fig. 1, but the round form is shown, as a further example. Fluted or accordion pleated sheets are considered as corrugated forms. Liner 21 may be a piece of corrugated plain paper, which is flexible in one direction so that the strip, if flexible, may be rolled lengthwise. The other liner 22, comparable to liner 12 in Fig. 1 is shown as a creped sheet with creping lines 23 to give the flexibility and stretch which will permit rolling in a well known way.

Fig. 3 is another form in which the interfacial liner 25 is not corrugated, but rather is provided with numerous raised portions as buttons or studs 26 of any desired form to serve as spacers. The liner is preferably creped to render it stretchable so that the spacing projections formed therein may have an appreciable height and a rigidity produced by taking out the stretch where the same are formed. The creping lines 27 may be parallel or crossing sets of creping lines. Numerous forms of stretchable corrugated and creped papers are available for use.

Fig. 4 shows a further modification in which the insulation body 30 is provided with a flat-faced liner 31, such as a creped or plain sheet, free from corrugations or buttons, and with a liner 32 comparable to liner 12 in Fig. 1, both liners providing ordinary flat-surfaced insulation. Spacing means 33 is secured to one of the liners, such as liner 31. The spacing means may be separate spacing members or an integral device providing raised spacers and ventilating space or spaces over the ordinary flat area of the insulation. Preferably the spacing means is a single sheet. A sheet of corrugated material or of button-carrying material may be used as is found in Figs. 1 to 3 inclusive. The advantage of the structure of Fig. 4 lies in applying the present invention to certain forms of insulation now available on the market. Advantages of the structures of Figs. 1, 2 and 3 accrue to the direct manufacture of insulation for the present invention.

It is of course to be understood that the insulation material itself may be treated to form the desired surface, as by moulding, pressing, cutting, etc. A mineral wool bat, for example, may be heated to fuse the fibers into a face which has elevated contact points and depressed space for ventilation.

Any of the forms of insulation of Figs. 1 to 4 inclusive, or their equivalents, may be applied so that the cold-side material of an insulating wall lies against the described ventilating face of the insulation. This is illustrated by reference to an ordinary house structure, but its use is of course not limited thereto. In Fig. 5 the insulation of Fig. 2 is chosen as an example, because the vertical corrugations are preferred to the horizontal ones where sheathing is applied horizontally. Vertical and horizontal corrugations are equally desirable where sheathing is placed at a 45° angle. The lines of corrugation crossing the sheathing joints give further vent for moisture to pass out of the wall. Also it is preferred to use moisture pervious building paper merely as wind-proofing, thus to permit moisture to dry outwardly by diffusion.

In Fig. 5 studding members 40 are erected vertically and are covered with overlapping strips of continuous or bulk-type insulation which strips run horizontally, such as that shown in Fig. 2. The flange 15 is secured to the studding 40. The vertical corrugations 20 are on the outside to receive the face of sheathing 41. This compresses the insulation over the studs 40 as shown at 42, forcing the body of insulation back into the wall space as shown at 43 without rupture because of the stretch in liner 22. On the sheathing a building paper 44 may be placed, and over this the exterior finish, such as shingles or clapboards 45. Any interior finish may be used on the studs such as lath 46 and plaster 47. This method of application has been termed commercially the "wrap-around" method. It contemplates ease of application. The stud-frame of the structure is erected, and the strips wrapped around the outside, covering openings for windows, and doors. The material is then cut away from such openings when and as desired, providing miscellaneous pieces for further use in irregular portions of the structure.

Another practical application of the invention involves the use of insulation which may be applied from one side of studding on the other side of which the cold-side structure is already in place or is later to be applied. Reference is made to the Davis U. S. Patent No. 1,870,838 showing flexible insulation blanket so applied against the inside of house sheathing in vertical strips lying between studs to which each strip is mounted. It is to be understood that in accordance with this invention, the insulation, however it is applied, is provided with a spacing interface where it contacts material like sheathing, the interface providing a ventilating space for ridding the structure of water by circulation or filtration of air through said space. Since the time of the Davis patent above referred to the insulation practice in houses has moved to use of thicker insulation as shown by the Spafford U. S. Patent No. 2,028,253. Insulation is now commonly provided in forms known as "wall-thick" intended for entirely filling the space between the inside and outside facing on the studs. Both flexible and rigid insulation is so used, and the common wall bats or blocks are excellent forms to which the present invention is practically an essential addition for warm sides which are air-conditioned or humidified.

Fig. 6 shows a wall-thick bat embodying the present invention. It comprises a rigid or flexible insulation body 50, preferably of insulation fiber, of mineral, vegetable or animal origin, or other form such as sponge for example. On one face of the bat there may be a facing sheet 51 as of paper, secured to the insulation and extending over the edges to form mounting flanges 52 if these are desired. One edge is preferably without a flange so that the ends of bats may be superposed using one of the end flanges as a seal over a joint, the other two flanges being secured to studding. Where the rear face of the bat is such as to contact the sheathing or other wall structure, it is provided with spacing means, which leave a ventilating space while permitting substantial general contact at the interface as a frictional hold to help support the bat. The preferred form of spacing means applied to the bat is a sheet of corrugated material 53. This may be corrugated plain paper or creped paper, but where the bat is more or less rigid the corrugated plain paper is preferred. The paper is preferably not waterproofed so that water gathering in the insulation itself is more readily evaporated by air moving in the ventilated space. The corrugated sheet may be waterproofed to protect itself, but perforated to permit moisture to pass through it. Otherwise the moisture may in part evaporate through the warm side making damp walls.

In Fig. 7 the bat of Fig. 6 is shown in mounted position. Studding 60 carries sheathing 61 on the outside, and on the inside, a suitable finish such as wall board 62. The insulation 50 is shown substantially compressed between the sheathing and the wall board. Flanges 52 are mounted between the studding 60 and the wall board 62. The corrugated sheet 53 carried by the insulation presses against the sheathing 61 and leaves vertical ventilating channels 63.

In comprehending the invention it should be appreciated that it is the cold weather which is dangerous to walls, and that the moisture moves from the interior to the exterior. It may condense in the insulation, or even beyond it in the sheathing. If the wall is sealed off by a perfect moisture barrier, such as metal foil, there is no danger on the cold side of the foil of precipitating water vapor from the warm side. The spacing means of this invention, even the waterproofed sheets, are not perfect moisture barriers. They contribute to the trouble by their transmission of water vapor and by the contact. They function by the space created to aid in drying out moisture from either side.

The structure permitting ventilation to dry out any moisture acquired by condensation as described, is not idle in function prior to condensation. The circulation even before condensation is effective to carry out moisture-laden air resulting from transmission of moisture vapor through the wall from the warm interior. Thus, as this is substituted by drier air filtering from the colder drier outside atmosphere, the dew-point of air in the ventilating space is lowered from that which it would have if the space were sealed against movement of air. Thus, the structure not only functions to permit drying out of wet walls, but also functions in advance to minimize the wetting of the walls.

The present invention is considered generic to the inventions of others comprising (1) the use of spacing means separate from the wall structure and from the insulation, and (2) the use of a spacing surface formed in the wall structure, such as grooves in the sheathing itself. Accordingly the appended claims are both generic to use of these structures, and are specific to my preferred form of making the insulation material in such form so that in applying it in a normal way the invention is practiced automatically and without special precaution otherwise to provide for creating a ventilating space.

I claim:

1. A wall structure for separating a warm atmosphere from a cold atmosphere of which the temperature lies below the dew-point temperature of the warm atmosphere, comprising in combination a series of spaced wall supports, bulk insulating material on the cold side of said supports, a cold side finishing structure secured to said supports and including the insulation material between it and said supports, and moisture-vapor transmitting sheet material interposed between said insulation material and said finishing structure providing direct facial contact with both and providing facially ventilating space in the wall between said sheet and said finishing structure, which space ventilates preferentially to the cold atmosphere, whereby movement of air is permitted in said space in the wall to dry out any moisture condensate on either side of said sheet material, said space serving also to carry away moisture vapor transmitted thereto from the warm atmosphere to lower the vapor content of said space in reducing the dew-point of said air and decreasing the tendency for condensation.

2. A wall structure for separating a warm atmosphere from a cold atmosphere of which the temperature lies below the dew-point temperature of the warm atmosphere, comprising in combination a series of spaced wall supports, blanket insulating material having bulk insulation and a moisture-vapor transmissive liner mounted on the cold side of said supports with said liner remote from said supports, and cold-side finishing material secured to said supports in contact with said liner, said liner having raised and depressed portions so arranged as to provide facial supporting contact between the liner and said finishing structure and facial ventilating space between them for the movement of air of said space into and out of said space, said space ventilating preferentially to the cold atmosphere, whereby said movement of air may dry out any moisture condensate on either side of said liner, said space serving also to carry away moisture vapor transmitted thereto from the warm atmosphere to lower the vapor content of said space in reducing the dew-point of said air and decreasing the tendency for condensation.

3. A wall structure for separating a warm atmosphere from a cold atmosphere of which the temperature lies below the dew-point temperature of the warm atmosphere, comprising in combination a series of spaced wall supports, strips of blanket insulating material running horizontally over said supports on the cold side thereof to form an inner insulating sheathing on said supports, said strips of insulating material having bulk for insulation and a moisture-vapor transmissive liner mounted on the cold side of said supports with said liner remote from said supports, said liner having corrugations therein running vertically in the wall, and an outer sheathing for the cold side of said wall in contact with the corrugated liner, whereby the vertical channels between said liner and said outer sheathing provide ventilating space in the wall for the movement of air of said space into and out of said space, said space ventilating preferentially to the cold atmosphere, whereby said movement of air may dry out any moisture condensate on either side of said liner, said space serving also to carry away moisture vapor transmitted thereto from the warm atmosphere to lower the vapor content of said space in reducing the dew-point of said air and decreasing the tendency for condensation.

PAUL A. WARD.